(12) United States Patent
Lane

(10) Patent No.: US 11,444,360 B2
(45) Date of Patent: Sep. 13, 2022

(54) HIGH VOLTAGE BATTERY MODULE PARALLEL CELL FUSING SYSTEM

(71) Applicant: Manaflex, LLC, Waikoloa, HI (US)

(72) Inventor: Robert Clinton Lane, Waikoloa, HI (US)

(*) Notice: Subject to any disclaimer, the term of this patent is extended or adjusted under 35 U.S.C. 154(b) by 0 days.

(21) Appl. No.: 17/027,695

(22) Filed: Sep. 21, 2020

(65) Prior Publication Data

US 2021/0091363 A1 Mar. 25, 2021

Related U.S. Application Data

(60) Provisional application No. 62/902,775, filed on Sep. 19, 2019.

(51) Int. Cl.
*H01M 50/502* (2021.01)
*H01M 10/42* (2006.01)
*H01M 10/48* (2006.01)
*H01M 50/543* (2021.01)
*H01M 50/572* (2021.01)

(52) U.S. Cl.
CPC ....... *H01M 50/502* (2021.01); *H01M 10/425* (2013.01); *H01M 10/482* (2013.01); *H01M 50/543* (2021.01); *H01M 50/572* (2021.01); *H01M 2200/103* (2013.01)

(58) Field of Classification Search
CPC .................................................. H01M 50/502
See application file for complete search history.

(56) References Cited

U.S. PATENT DOCUMENTS

| | | | | |
|---|---|---|---|---|
| 2012/0171527 | A1* | 7/2012 | Hiroma | H01M 50/209 429/61 |
| 2013/0260191 | A1* | 10/2013 | Takahashi | H01M 50/572 429/61 |
| 2016/0181579 | A1* | 6/2016 | Geshi | H01M 50/581 429/61 |
| 2016/0315304 | A1* | 10/2016 | Biskup | H01M 50/502 |
| 2017/0012331 | A1* | 1/2017 | Ng | H01M 10/653 |
| 2017/0214033 | A1* | 7/2017 | Takano | H01H 85/12 |
| 2018/0205048 | A1* | 7/2018 | Enomoto | H01M 10/658 |

* cited by examiner

*Primary Examiner* — Brian R Ohara
(74) *Attorney, Agent, or Firm* — WPAT Law, P.C.; Anthony King

(57) ABSTRACT

A fusing system for a brick of lithium ion battery in a battery module is provided where the fusing system has a combination of low-voltage fuses and a high-voltage fuse. The low-voltage fuse can have one or more fusing elements in a springy spiral configuration or a straight configuration with the fuse element encapsulated.

13 Claims, 7 Drawing Sheets

HIGH VOLTAGE BATTERY MODULE PARALLEL CELL FUSING SYSTEM

CROSS-REFERENCE TO RELATED APPLICATIONS

This application claims priority to U.S. Provisional Pat. No. 62/902,775, filed on Sep. 19, 2019, which is hereby incorporated by reference in its entirety.

Although incorporated by reference in its entirety, no arguments or disclaimers made in the parent application apply to this non-provisional application.

FIELD OF THE DISCLOSURE

The present disclosure relates to a fusing system for a battery module.

BACKGROUND OF THE DISCLOSURE

Currently in high voltage lithium ion batteries "pack fusing" is a requirement and "cell fusing" is not. However, certain battery manufacturers are making low voltage cell fusing possible through wirebonds or specific metal geometries that will fuse at certain current versus time profiles. An exemplar profile is illustrated in FIG. 8.

When a battery pack fuses it is possible to bypass a pack fuse if improperly designed or if the pack is shorted in a way to bypass the pack fuse. In this case a module will start to fuse at the cell fuses or internal cell current interrupt devices. If the pack has cell fusing in the interconnect then each fuse will start to clear at low voltage until the last fuse in a parallel cell arrangement fuses and it sees the short voltage which can be near the pack voltage. Current battery pack technologies have increasing voltages from 400 VDC and increasing to 800 VDC and more. If a cell fuse sees the pack voltage the clearing event will be much more explosive and difficult to clear. This last clearing could even lead to module runaway and then pack thermal runaway.

Therefore, there is a continuing need for new ways to prevent module runaway and pack thermal runaway.

The disclosed embodiments may seek to satisfy one or more of the above-mentioned needs. Although the present embodiments may obviate one or more of the above-mentioned needs, it should be understood that some aspects of the embodiments might not necessarily obviate them.

All referenced patents, applications and literatures are incorporated herein by reference in their entirety. Furthermore, where a definition or use of a term in a reference, which is incorporated by reference herein, is inconsistent or contrary to the definition of that term provided herein, the definition of that term provided herein applies and the definition of that term in the reference does not apply.

BRIEF SUMMARY OF THE DISCLOSURE

In a general implementation, a fusing system in a brick of battery cells within a battery module has a first terminal, a first cell interconnect coupled to the first terminal to receive a flow of current from the first terminal, a plurality of battery cells coupled to the first cell interconnect in parallel, and a second cell interconnect coupled to the same plurality of battery cells in parallel.

In another aspect combinable with the general implementation, there can be a second terminal coupled to the second cell interconnect.

In another aspect combinable with the general implementation, wherein each battery cell within a majority of the plurality of battery cells is coupled to the first cell interconnect via a low-voltage fuse, and wherein at least one of the plurality of battery cells is coupled to the first cell interconnect via a high-voltage fuse.

In another aspect combinable with the general implementation, wherein the low voltage fuse has a contact portion and at least one arm, and the contact portion makes a direct contact with one of said battery cell from said majority of battery cells, and said at least one arm acts as the fusing element connecting the contact portion to the first cell interconnect.

In another aspect combinable with the general implementation, wherein the at least one arm has a curved shape.

In another aspect combinable with the general implementation, wherein the at least one arm has a spiral shape.

In another aspect combinable with the general implementation, wherein the low voltage fuse has at least two arms in a double spiral configuration.

In another aspect combinable with the general implementation, wherein the low voltage fuse has at least three arms in a treble spiral configuration.

In another aspect combinable with the general implementation, wherein the arm that acts as a fuse element of the low voltage fuse can be in any geometric shape, size, and varied thickness along its length.

In one aspect combinable with the general implementation, wherein the arm that acts as a fuse element of the low voltage fuse can be a straight linear arm with a narrowed breaking point. In one embodiment, the narrowed breaking point can be located partially or entirely in an interstitial space or sandwiched between two layers of dielectric composite materials. By doing so, the encapsulant can minimize the spread of polluted gas when the fuse element melts.

In yet another embodiment, whether the fuse element arm is straight, spiral, or other geometries, the fuse element arm can be entirely or partially encapsulated with silicone or other non-flammable dielectric material to minimize the spread of polluted gas when the fuse element melts.

In another aspect combinable with the general implementation, wherein the contact portion of the low-voltage fuse can be welded onto the battery cell.

In another aspect combinable with the general implementation, wherein the contact portion of the low-voltage fuse is not on a same plane as the first cell interconnect when the contact portion is welded to a battery cell.

In another aspect combinable with the general implementation, wherein the at least one arm of the low-voltage fuse has a springy property with a biasing force that tends to move the contact portion of the low-voltage fuse away from the battery cell during fusing and clearing of the arc.

In another aspect combinable with the general implementation, wherein the low-voltage fuses are designed to melt before the high-voltage fuse.

In another aspect combinable with the general implementation, the low-voltage fuse is designed such that when it opens up, a gap remains between the contact portion and the cell interconnect. This gap can have a sufficient opening to ensure that arcs are not created in the presence of conductive airborne particulate between the two conductive ends. This polluted gas may come from the melt fuse element or from damaged battery cells, or from other sources. This gap allows sufficient clearance to minimize reoccurrence of arcs between the two ends which can lead to a thermal runaway event.

In another aspect combinable with the general implementation, wherein the high-voltage fuse can be a cartridge fuse and it minimizes arcing and thermal runaway events. The cartridge fuse can provide sufficient creepage and clearance to prevent or minimize arcs from continuing to short any battery cells within the brick or from any other ground metal.

Accordingly, the present disclosure is directed to battery module where a brick of battery cells within the module implements a fusing system containing a mixture of low-voltage fuses and at least one high-voltage fuse in parallel that substantially obviate one or more problems due to limitations and disadvantages of the related art.

Among the many possible implementations of the contemplated fusing system, a majority of battery cells are each connected to the cell interconnect via a low-voltage fuse whereby current must run through a low-voltage fuse in order to reach each of such majority of battery cells.

In other embodiments, a novel design of low-voltage fuse can be implemented where the fusing elements are configured in a single, double, or treble spiral surrounding the contact portion which can be welded onto the terminal of a battery cell. While embodiments of single, double, and treble spiral configurations are discussed in this specification, more than three such spiral fusing elements are also specifically contemplated.

Further, it is contemplated that the spiral fusing elements, or spiral arms, can have a springy property such that prior to welding the contact portion to a battery cell, the contact portion can be substantially flush with the cell interconnect or further away in a direction opposite to where the battery cells would be installed. In this way, the contact portion is biased against its springy tendency to weld onto a battery cell. The springy property is contemplated to remain within the spiral arms such that the spiral arm melts, the part of the spiral arm that remains connected to the cell interconnect would spring back towards the cell interconnect and away from the battery cell. This can create a safer distance and can minimize arcing between the remaining portion of the spiral arm and the battery terminal.

It is still further contemplated that such design of welding a battery cell at a horizontal plane displaced from the plane of the cell interconnect can create a safe distance and sufficient opening for safe release of polluted gas within the brink of battery cells.

Contemplated spiral arms can have various thickness, and it can have varied thickness along the length of a spiral arm.

In other embodiment, the spiral arm has a springy property that pulls the arms away from the center of the contact portion. In other words, the contact portion may or may not be horizontally displaced from the plane of the cell interconnect, but once a part of the spiral arm melts, the part of the spiral arm that remains connected to the cell interconnect pulls itself toward the cell interconnect and away from the contact portion, thereby also making a safer distance and clearance between the cell interconnect even if the contact portion that is welded to the battery cell terminal is in the same plane as the cell interconnect.

Among the many possible high-voltage fuses contemplated for fusing at least one battery cell within the brick of battery cells, a cartridge fuse can be used. A high-voltage fuse with the right amperage can be used to minimize arcing and bypass of current.

While this specification contains many specific implementation details, these should not be construed as limitations on the scope of any inventions or of what may be claimed, but rather as descriptions of features specific to particular implementations of particular inventions.

Certain features that are described in this specification in the context of separate implementations can also be implemented in combination in a single implementation. Conversely, various features that are described in the context of a single implementation can also be implemented in multiple implementations separately or in any suitable subcombination.

The details of one or more implementations of the subject matter described in this disclosure are set forth in the accompanying drawings and the detailed description below. Other features, aspects, and advantages of the subject matter will become apparent from the description, the drawings, and the claims.

BRIEF DESCRIPTION OF THE DRAWINGS

It should be noted that the drawing figures may be in simplified form and might not be to precise scale. In reference to the disclosure herein, for purposes of convenience and clarity only, directional terms such as top, bottom, left, right, up, down, over, above, below, beneath, rear, front, distal, and proximal are used with respect to the accompanying drawings. Such directional terms should not be construed to limit the scope of the embodiment in any manner

Figure 1:
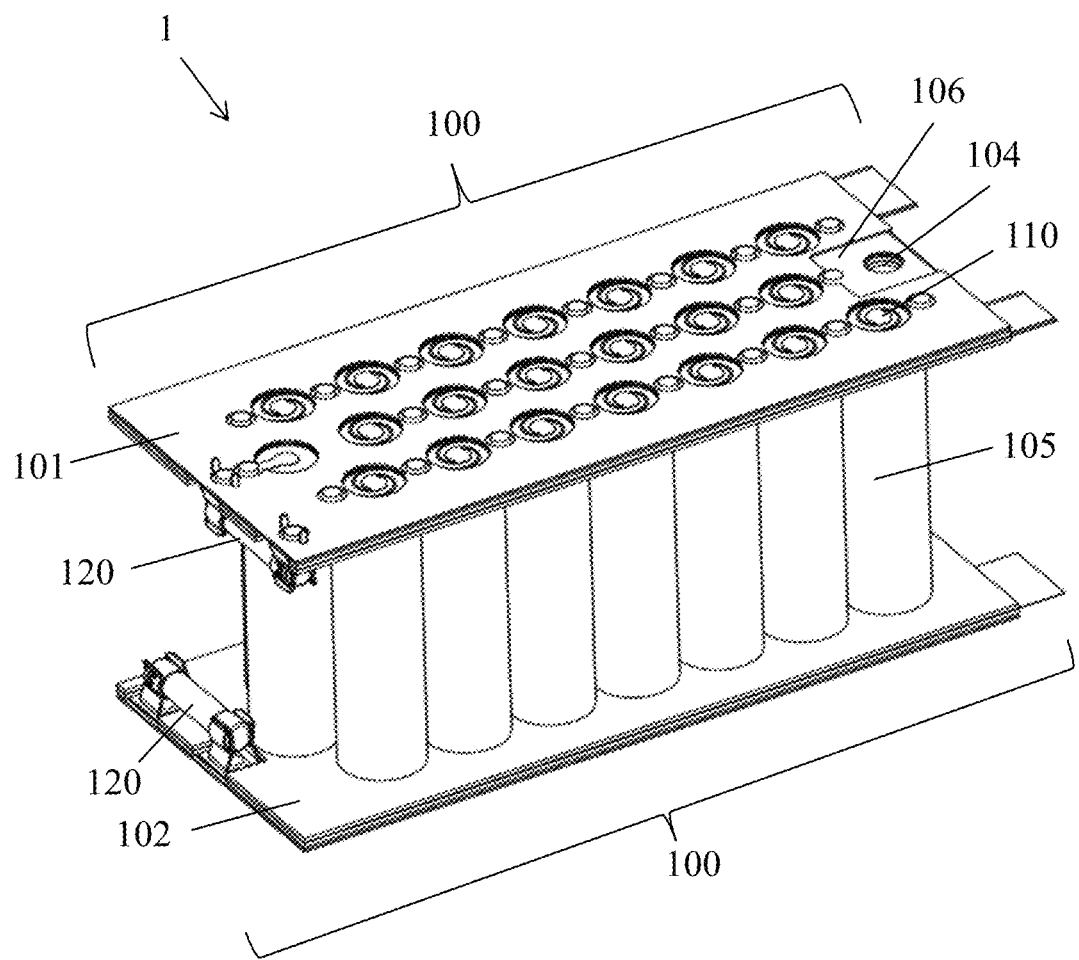
FIG. 1 is a perspective view of the contemplated fusing system implemented in a brick of battery cells, according to one aspect of the disclosure.

The following call-out list of elements in the drawing can be a useful guide when referencing the elements of the drawing figures:

1 Brick of battery cells
  100 Fusing system
  101 Top cell interconnect
  102 Bottom cell interconnect 103 Dielectric layer
104 Terminal
105 Battery cell
106 Exposed metal
109 Electrically isolated patch
110 Low voltage fuse
112 Contact portion
114 Spiral arm
115 Encapsulant
116 Gap
120 High voltage fuse
121 Glass tube
122 First spring clamp
123 Second spring clamp
124 First end cap
125 Second end cap
126 First link contact
127 Second link contact
128 Conductive bridge
129 Ceramic tube
210 Low voltage fuse
212 Contact portion
214 Fuse element
215 Encapsulant
217 Gap

DETAILED DESCRIPTION OF THE DISCLOSURE

The different aspects of the various embodiments can now be better understood by turning to the following detailed description of the embodiments, which are presented as illustrated examples of the embodiments as defined in the claims. It is expressly understood that the embodiments as defined by the claims may be broader than the illustrated embodiments described below.

In a typical large high-voltage battery pack, there can be several lower voltage modules in series. Within each lower voltage battery modules there can have several "bricks" of batteries in series. Each brick can contain many lithium ion cells in parallel. The inventor has discovered a novel system and method of fusing a brick of battery cells. Although the embodiments herein are described with implementation in a brick of battery cells, it is particular contemplated that this novel system can be used in other types of cells and energy storage devices such as capacitors.

This contemplated general concept provides that during a short or other disruptive events within a brick, further damage to the module can be kept under control by having N-1 number of fuse to melt first at low voltage and then the last fuse to melt at a high voltage using a commercially available high-voltage fuse with high interrupt current rating.

There can be many causes of a short. For example, when an electric vehicle collides with a physical object, its battery pack may be physically damaged by blunt force and even the battery housing may be punctured. Such blunt force may also physically puncture a battery cell and/or a cell interconnect, thereby causing a short at or near the puncture site. In another example, a defected battery cell may overheat during a fast-charging session, leading to rupturing or a small explosion. This thermal event at the defected battery cell can lead to a thermal runaway event where neighboring battery cells also ruptures and explodes.

Referring now to FIG. 1. Here, a brick 170 is shown having twenty-one battery cells 105. It should be noted that the contemplated fusing system can be implemented to a brick of any number of battery cells. This group of battery cells 105 are connected in parallel between a top cell interconnect 101 and a bottom cell interconnect 102. A cell interconnect is defined as a multi-layer material which can include an electrically conductive sheet material and sandwiched between two dielectric layers such as mica. Other dielectric materials like GPO1 GPO3 and FR4 can also be used. In FIG. 1, the top cell interconnect 101 itself is also labeled as the fusing system 100 because it contains the low-voltage cell fuses 110 and the high-voltage fuse 120. Here, the bottom cell interconnect 102 is also shown to have the contemplated fusing system 100.

The contemplated fusing system 100, however, is not limited to necessarily require the cell interconnect 101, 102 or being part of the cell interconnect 101, 102. For example in one contemplated embodiment, the novel fusing system 100 can be a system of low-voltage fuses in combination with at least one high-voltage fuse in a battery module whether these fuses are specifically installed directly on the cell interconnect 101, 102 or elsewhere in the battery module.

In one contemplated embodiment, a brick 170 can have the fusing system 100 implemented in either the top cell interconnect 101 or the bottom cell interconnect 102.

In another contemplated embodiment, a brick 170 can have the fusing system 100 implemented in both the top cell interconnect 101 and the bottom cell interconnect 102.

In the top cell interconnect 101 shown in FIG. 1, there are twenty low-voltage cell fuses 110. The remaining one battery cell not provided with a low-voltage cell fuse 110 is provided with a high-voltage fuse, as will be explained in more details later.

Also shown in FIG. 1 is a terminal 104 on the exposed metal sheet 106 of the electrically conductive sheet material. Besides the exposed metal sheet 106, the rest of the top side of the top cell interconnect 101 is covered by mica or any other suitable dielectric material.

Similarly, the side of the bottom cell interconnect 102 facing the battery cells 105 can also be mostly covered by mica or any other suitable dielectric material.

While the cell interconnect 101, 102 are shown in a generally flat and rectangular shape, it should be noted that other shapes, sizes, and dimensions are also possible.

Figure 2:
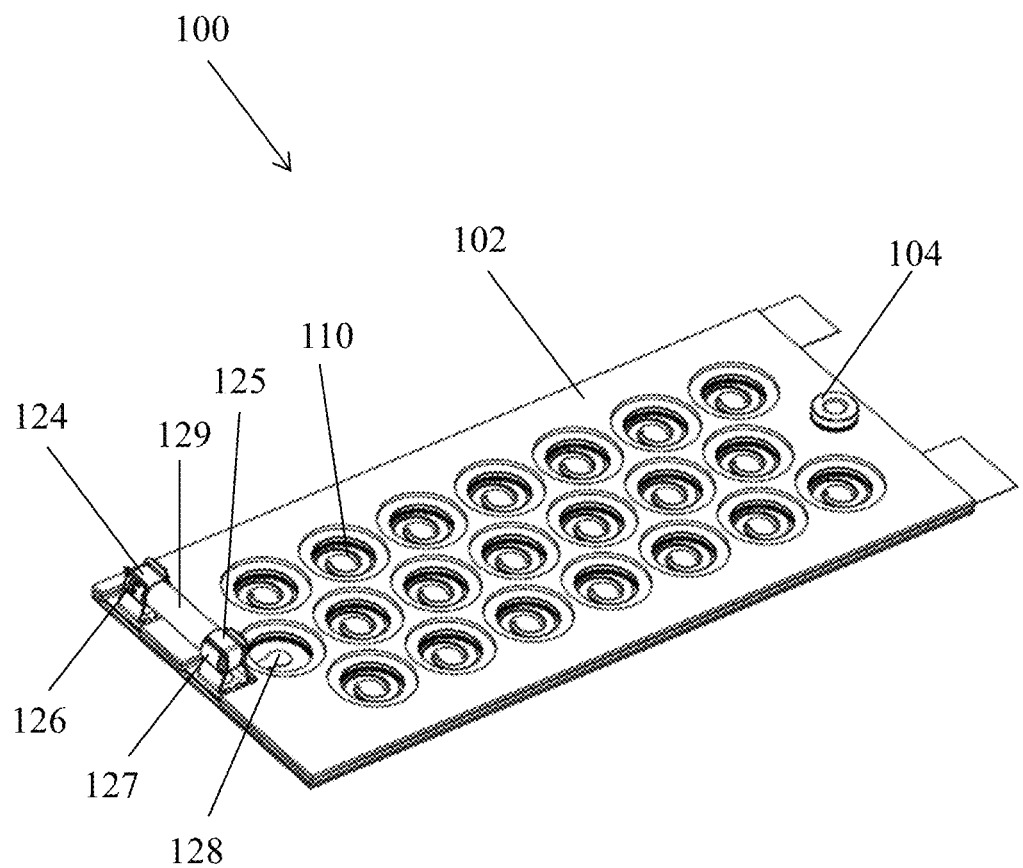
FIG. 2 is a perspective view of the fusing system of FIG. 1 in a cell interconnect, according to one aspect of the disclosure.
Figure 3:
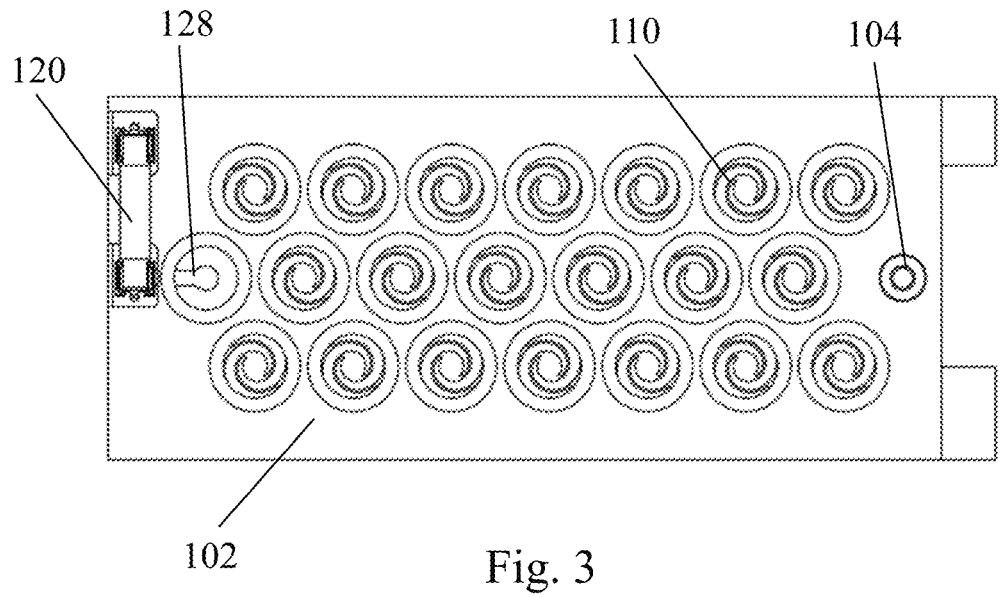
FIG. 3 is a top plan view of the fusing system of FIG. 2, according to one aspect of the disclosure.
Figure 4:
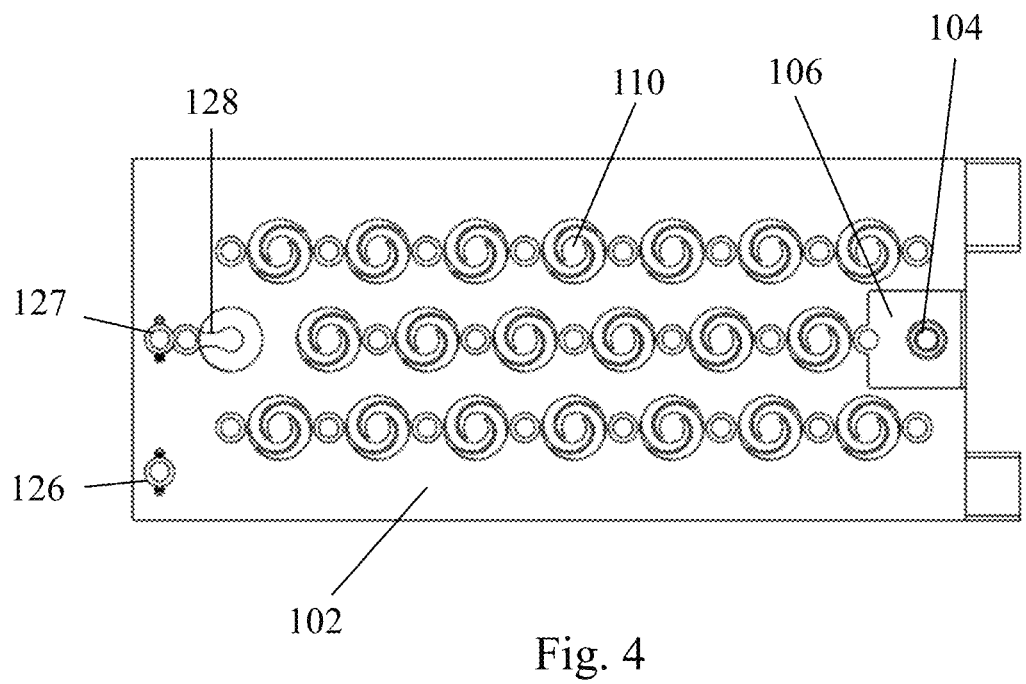
FIG. 4 is a bottom plan view of the fusing system of FIG. 2, according to one aspect of the disclosure.

Referring now to FIGS. 2-4. Here, the top cell interconnect 101 and all of the battery cells 105 have been removed leaving only the bottom cell interconnect 102. During normal operation, current flows from terminal 104 of one cell interconnect 101, 102 to the terminal 104 of the other cell interconnect 101, 102. Between these two terminals 104, the current goes through to the battery cells 105 (in parallel) via low-voltage cell fuses 110 and one high-voltage fuse 120.

Figure 10:
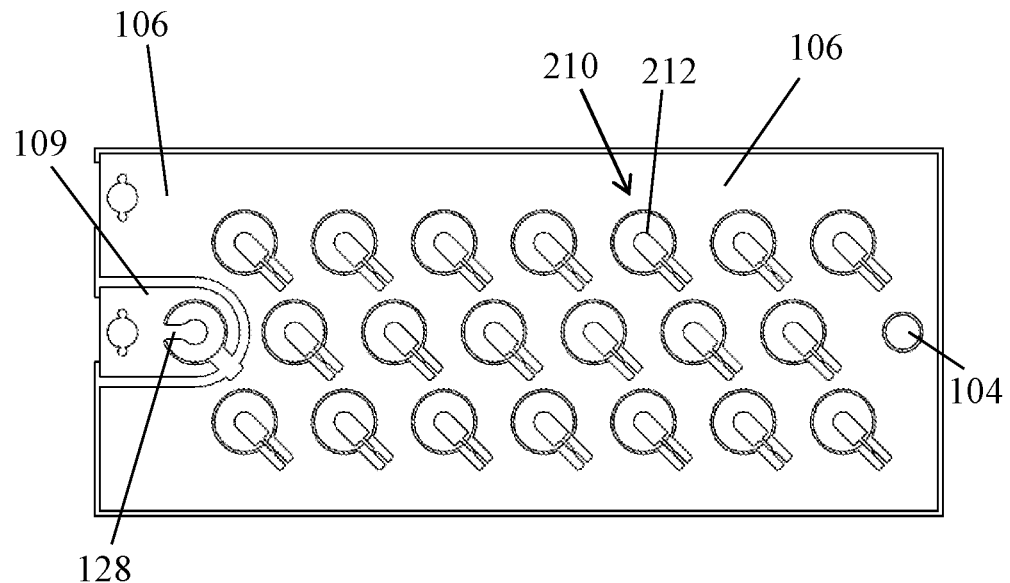
FIG. 10 is a top plan view of the metal layer of a cell interconnect having a different design in the fusing element of the low-voltage fuses, according to one aspect of the disclosure.
Figure 11:
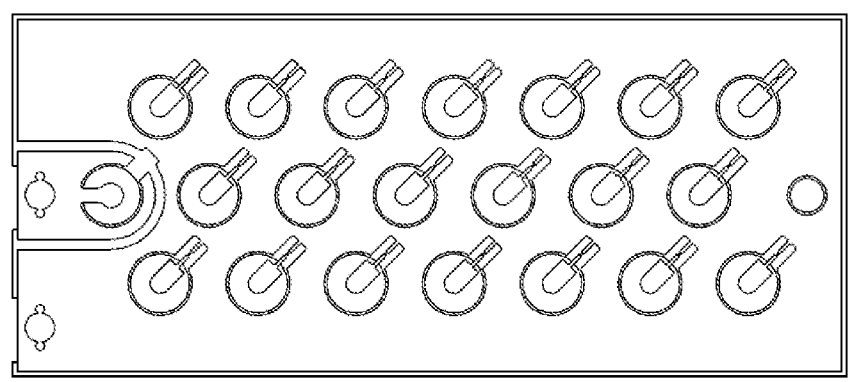
FIG. 11 is a bottom plan view of the metal layer of FIG. 10, according to one aspect of the disclosure.

The top layer of the cell interconnect 102 can be a mica layer as mentioned above. Under the mica layer can be an electrically conductive layer. An exemplar design of this electrically conductive layer is shown in FIGS. 10 and 11. Most notably in FIGS. 10 and 11, there can be N-1 number of low-voltage fuses 210 directly connected to the exposed metal 106 of the electrically conductive layer. There can be an electrically isolated patch 109 formed along the edge on the far end opposite the terminal 104. This patch 109 is electrically isolated from rest of the exposed metal 106 and is electrically connected to the exposed metal 106 only via the high-voltage fuse 120. This electrically isolated patch 109 can be located elsewhere in the design of the metal layer so long as the same principle is followed to have N-1 number of battery cells each connected via a low-voltage fuse in parallel with one battery cell connected via a high-voltage fuse.

Returning now to FIGS. 2-4, the terminal 104 can be directly provided on the electrically conductive layer. The electrically conductive layer can have twenty-one circular openings, each provided for a battery cell 105. Of the twenty-one circular openings, twenty of them are provided with a low-voltage cell fuse 110. The top mica layer has corresponding twenty-one circular openings in order to expose the low-voltage cell fuses 110.

Of the twenty-one circular openings, one of them is provided with a conductive bridge 128 which is not directly connected to the electrically conductive layer. Instead, the conductive bridge 128 can be disposed on an electrically isolated patch (not shown) such as the one previously discussed in FIGS. 10 and 11. The conductive bridge 128 can be directly and electrically connected to link contact 127 which in turn electrically connects to end cap 125 of the high-voltage fuse. The end cap 125 is then electrically connected to a fusing element within the ceramic tube 129 and then electrically connected to end cap 124. End cap 124 is in turn electrically connected to link contact 126 which in turn is electrically connected to the electrically conductive layer of cell interconnect 102. Therefore, N-1 number of battery cells 105 in this arrangement is provided with a low-voltage fuse 110 while current must flow through high-voltage fuse 120 to get to the one remaining battery cell 105.

It should be noted that the high-voltage fuse 120 can be a cartridge fuse that can be replaced. In other embodiments, a replaceable high-voltage fuse 120 may not be necessary because when a battery module fuses the module may become damaged forever, making it unnecessary to replace the fuse. Therefore, other permanent and cost-effective types of high-voltage fuses can be provided.

This concept solves problems known with existing off-the-shelf parts and with current battery pack design practices. The high-voltage cell fuse 120 could have a lower cost than a known pack fuse, so it is conceivable that this strategy is a more robust fusing strategy than battery pack fusing strategies today.

FIG. 4 shows the opposite side of the cell interconnect 102. This side of the cell interconnect can also be covered with mica. Here, a mica layer is provided. Conductive bridge 128 is not electrically connected to the whole sheet of electrically conductive layer except through the link contacts 126, 127 and the high-voltage fuse 120 as described above.

Figure 5:
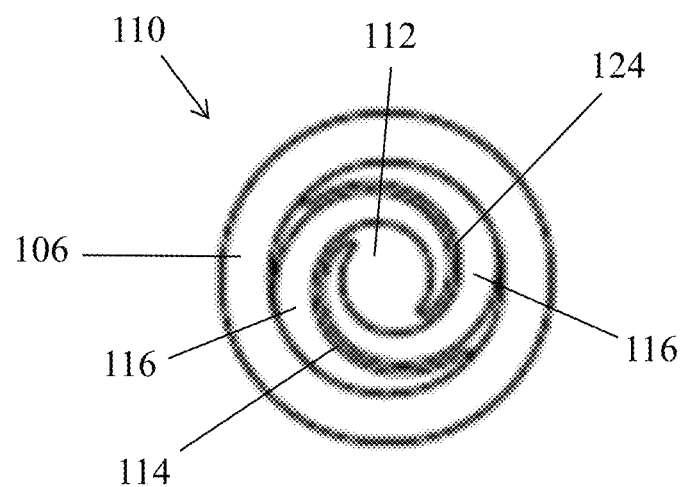
FIG. 5 is a close-up top plan view of a low-voltage fuse in the contemplated fusing system of FIG. 2, according to one aspect of the disclosure.
Figure 6:
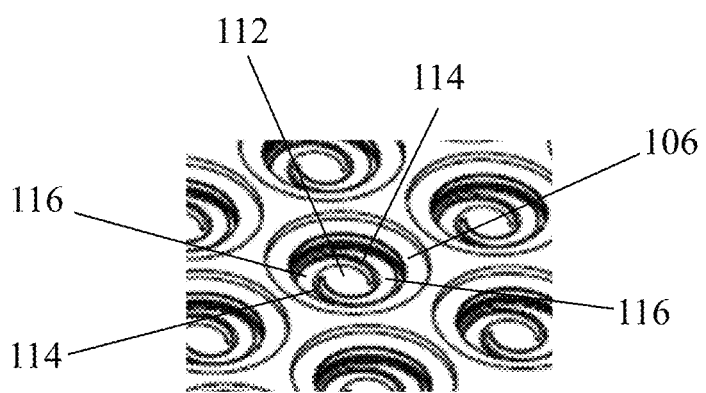
FIG. 6 is a side perspective view of the low-voltage fuse of FIG. 5, according to one aspect of the disclosure.

FIGS. 5 and 6 show the low-voltage fuse 110 in close-up views. The low-voltage fuse 110 can have a contact portion 112 disposed in the middle of a circular opening. The contact portion 112 can be welded onto a battery cell 105. There can be two spiral arms 124 electrically connecting the contact portion 112 to the rest of the metal layer of the cell interconnect. In between the contact portion 112 and the end of the circular opening is the gap 116.

Contemplated gap 116 can have a sufficient width to allow a polluted gas from the battery cells to escape to the opposite side of the cell interconnect 112, 113. Further, there can be provided vent holes or other ventilation means to further transport the polluted gas away from the battery cells 105. The inventor has discovered that the polluted gas can become a trigger for a thermal runaway event if such polluted gas is allowed to reach neighboring battery cells 105. Therefore, one specific embodiment offers sufficient gap distance between the contact portion 112 and the edge of the circular opening. In another embodiment which will be discussed in more details in FIGS. 8 and 9, this gap 116 can be created by a contact portion 112 that is vertically offset from the main plane of the cell interconnect 102.

Figure 7:
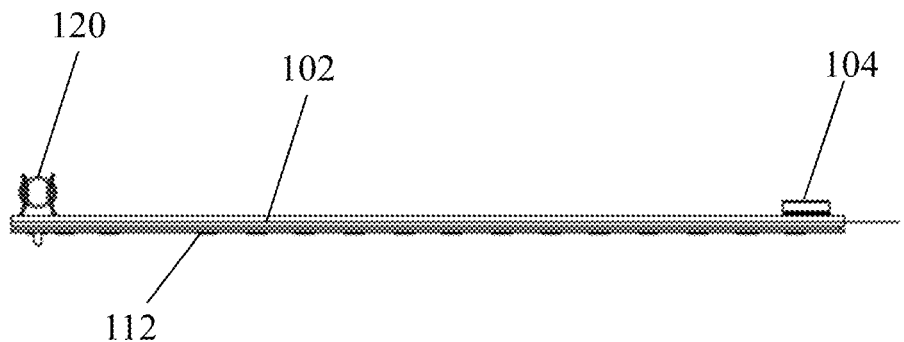
FIG. 7 is a side plan view of the low-voltage fusing system of FIG. 2, according to one aspect of the disclosure.

Referring now to FIG. 7, one particular embodiment of cell interconnect 102 is shown. Here, the contact portions 112 can be seem vertically offset from the general plane of the cell interconnect 102 at rest. In another embodiment, the contact portions 112 are not vertically offset from the general plane of the cell interconnect 102 at rest. Instead, during assembly of a brick 1 of battery cells, the contact portions 112 can be biased away from the general plane of the cell interconnect 102 (such as that shown in FIGS. 8 and 9) and welded onto corresponding battery cells 105.

Figure 8:
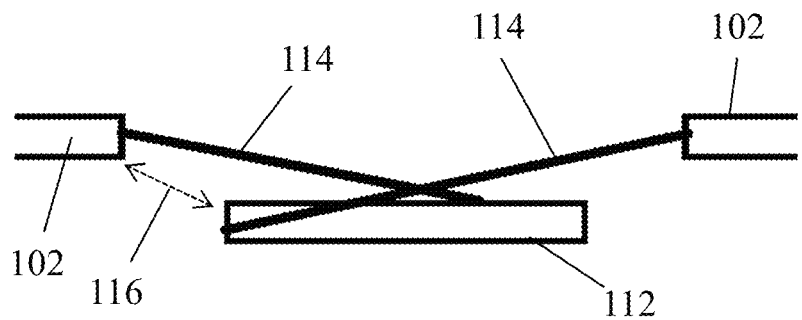
FIG. 8 is a close-up side view of a low-voltage fuse of FIG. 5, according to one aspect of the disclosure.

In FIG. 8, the contact portion 112 can be elastically held in place by two spiral arms 114. The spiral arms can be the fusing element and can have a narrowed portion at a specific location to ensure when it melts, it melts at a certain spot along the spiral arm 114. In one embodiment, this can be located closer to the cell interconnect 102 and further away from the contact portion 112. The spiral arms 114 can essentially from a tension spring with a springy property that biases the contact portion 112 in an upward direction as shown in FIG. 8. During assembling of the brick 1 of battery cells 105, the contact portion 112 can be displaced downward towards the battery cells 105 and then welded onto the battery cells 105. The spiral arms 114 can retain its springy property or may be shape memory such that when the spiral arms 114 melts at any spot along its length, the remaining unmelt portion of the spiral arm 114 that is still connected to the cell interconnect 102 would spring upwards and away from the battery cell 105, thereby minimizing the chance of arcing between the remaining unmelt portion and the battery cell 105.

Figure 9:
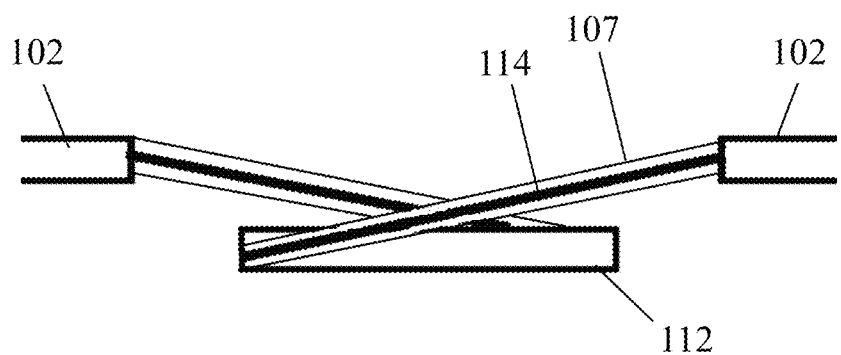
FIG. 9 is a close-up side view of a low-voltage fuse with its arms encapsulated in silicon, according to one aspect of the disclosure.

The low-voltage fuse shown in FIG. 9 is similar to the one shown in FIG. 8 except here, the spiral arms 114 are encapsulated in silicone 107. The fuse element is encapsulated with silicone or any other suitable encapsulant. This encapsulant will degrade and draw energy 15 from an existing arc and help to isolate arc from metal parts in close vicinity.

Further, the encapsulant can increase the voltage of a particular low-voltage fuse 110 for clearing the arc and could eliminate a need to have a cartridge certified HV fuse 120 altogether. Therefore, one particular embodiment of this disclosure includes a fusing system using only low-voltage fuses 110 such as those shown in FIGS. 9 and 13, and no high-voltage fuse 120 is used.

Referring now to FIG. 10, which illustrates a design of the metal layer embedded within the cell interconnect 101, 102. As briefly discussed above, the metal layer of cell interconnect 102 of FIG. 2 can be similar to this in that an electronically isolated patch 109 of metal can be provided to ensure that one single battery cell 105 is in parallel with the rest of the battery cell 105 and is electronically protected by a high-voltage fuse 120. FIG. 11 is simply the underside of the metal layer of FIG. 10.

Figure 12:
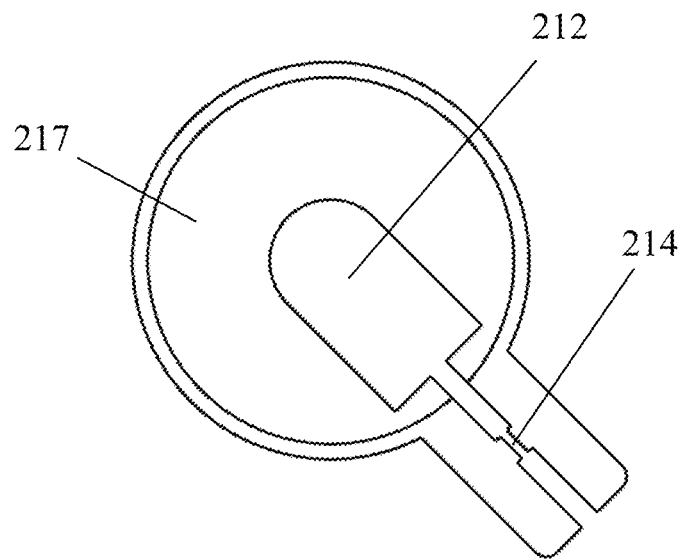
FIG. 12 is a close-up view of the low-voltage fuse shown in FIG. 10, according to one aspect of the disclosure.

Besides a double spiral 114 design for the fuse element, a low-voltage fuse 210 can have a straight fuse element 214 with a narrowed portion disposed or embedded between the layers of cell interconnect 102. In FIG. 12, the fuse element 214 can be centered in the interstitial space away from the gap 217. In this way, polluted air from the melt fuse element 214 is less likely to affect the battery cells 105 underneath the contact portion 212.

Figure 13:
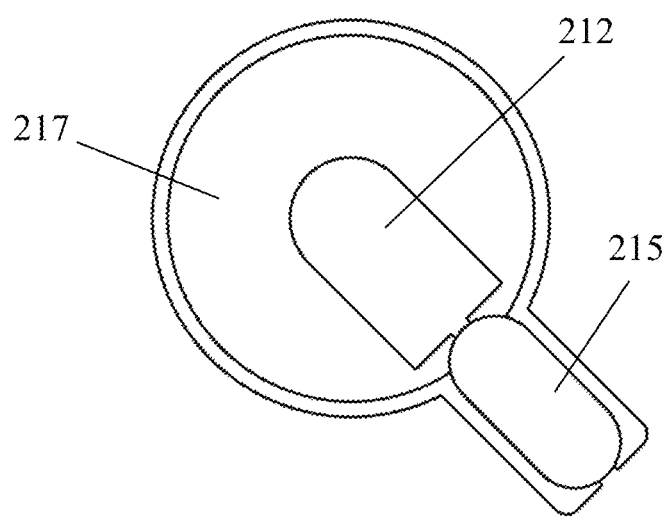
FIG. 13 is a close-up view of another embodiment of a low-voltage fuse having its fuse element encapsulated in silicon, according to one aspect of the disclosure.

In another embodiment, the straight fuse element of FIG. 12 can be encapsulated by an encapsulant 215, such as silicone (see FIG. 13). This can increase the voltage for clearing the arc and could eliminate a need for a cartridge certified HV fuse.

The specification has set out a number of specific exemplary embodiments, but those skilled in the art will understand that variations in these embodiments will naturally occur in the course of embodying the subject matter of the disclosure in specific implementations and environments. It will further be understood that such variation and others as well, fall within the scope of the disclosure. Neither those possible variations nor the specific examples set above are set out to limit the scope of the disclosure. Rather, the scope of the present disclosure is defined solely by the claims set out below.

Thus, specific embodiments and applications of high-voltage battery module parallel cell fusing system have been disclosed. It should be apparent, however, to those skilled in the art that many more modifications besides those already described are possible without departing from the disclosed concepts herein. The disclosed embodiments, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Insubstantial changes from the claimed subject matter as viewed by a person with ordinary skill in the art, now known or later devised, are expressly contemplated as being equivalent within the scope of the claims. Therefore, obvious substitutions now or later known to one with ordinary skill in the art are defined to be within the scope of the defined elements. The claims are thus to be understood to include what is specifically illustrated and described above, what is conceptually equivalent, what can be obviously substituted and also what essentially incorporates the essential idea of the embodiments. In addition, where the specification and claims refer to at least one of something selected from the group consisting of A, B, C . . . and N, the text should be interpreted as requiring at least one element from the group which includes N, not A plus N, or B plus N, etc.

What is claimed is:

1. A fusing system in a brick of battery cells comprising:
a first terminal;
a first cell interconnect coupled to the first terminal to receive a flow of current from said first terminal;
a plurality of battery cells in said brick coupled to the first cell interconnect in parallel;
a second cell interconnect coupled to the plurality of battery cells in parallel;
a second terminal coupled to said second cell interconnect;
wherein a majority of said plurality of battery cells are each coupled to the first cell interconnect via a low-voltage fuse; and
wherein at least one of said plurality of battery cells is coupled to the first cell interconnect via a high-voltage fuse.

2. The fusing system as recited in claim 1, wherein the low voltage fuse has a contact portion and at least one arm, said contact portion makes a direct contact with one of said battery cell from said majority, and said at least one arm acts as the fusing element connecting the contact portion to the first cell interconnect.

3. The fusing system as recited in claim 2, wherein the at least one arm has a curved shape.

4. The fusing system as recited in claim 3, wherein the at least one arm has a spiral shape.

5. The fusing system as recited in claim 4, wherein the low voltage fuse has at least two arms in a double spiral configuration.

6. The fusing system as recited in claim 2, wherein the contact portion is not on a same plane as the first cell interconnect.

7. The fusing system as recited in claim 2, wherein the at least one arm has a springy property with a biasing force that tends to move the contact portion of the low voltage fuse away from the battery cell.

8. The fusing system as recited in claim 2, wherein the high-voltage fuse is a cartridge fuse and it minimizes arcing and thermal runaway events by providing sufficient creepage and clearance to prevent arcs from continuing to short to the plurality of battery cells or other ground metal.

9. The fusing system as recited in claim 8, wherein the low-voltage fuses are designed to melt before the high-voltage fuse.

10. The fusing system as recited in claim 9, wherein when the low-voltage fuse opens up, a gap is created with sufficient opening to allow a polluted gas to escape from a vicinity of the plurality of battery cells.

11. The fusing system as recited in claim 3, wherein the fusing element of the low-voltage fuse is encapsulated by silicone or silicone based composite encapsulant.

12. The fusing system as recited in claim 9, wherein the fusing element of the low-voltage fuse is encapsulated by silicone or silicone based composite encapsulant.

13. The fusing system as recited in claim 12, wherein break point of the fusing element is located within an interstitial space sandwiched between two dielectric layers of composite material.

* * * * *